United States Patent [19]

Blanchard et al.

[11] 4,415,707
[45] * Nov. 15, 1983

[54] PROCESSING MODIFIER FOR POLYOLEFINS

[75] Inventors: Robert R. Blanchard, Brusly; Tommy R. Bourne, Baton Rouge, both of La.

[73] Assignee: The Dow Chemical Co., Midland, Mich.

[*] Notice: The portion of the term of this patent subsequent to Aug. 3, 1999 has been disclaimed.

[21] Appl. No.: 401,052

[22] Filed: Jul. 22, 1982

Related U.S. Application Data

[63] Continuation-in-part of Ser. No. 284,419, Jul. 20, 1981, Pat. No. 4,342,848.

[51] Int. Cl.$^3$ .................. C08L 23/04; C08L 23/12; C08L 23/06; C08L 29/10
[52] U.S. Cl. .................................... 525/231; 524/275
[58] Field of Search ...................... 525/231; 524/275

[56] References Cited

U.S. PATENT DOCUMENTS

| | | | |
|---|---|---|---|
| 3,069,369 | 12/1962 | Galbraith et al. | 260/23 |
| 3,265,649 | 8/1966 | Faltings et al. | 260/23 |
| 3,299,181 | 1/1967 | Coover, Jr. et al. | 260/897 |
| 3,488,306 | 1/1970 | Thormahlen et al. | 260/23 |
| 3,546,146 | 12/1970 | Sockloff et al. | 260/17 |
| 3,657,114 | 4/1972 | Smith | 260/23 H |
| 3,803,065 | 4/1974 | Arai et al. | 260/23 H |
| 3,879,331 | 4/1975 | Parker | 260/33.6 A |

*Primary Examiner*—Carman J. Seccuro
*Attorney, Agent, or Firm*—A. J. Young

[57] ABSTRACT

The use of polyvinyloctadecyl ethers as a processing modifier in the extrusion of polyolefin resins leads to a smoother surface of the extruded resin. Other beneficial effects include improved values of such important resin characteristics as tensile strength at break, percentage elongation at break, tearing resistance, and impact resistance.

4 Claims, No Drawings

PROCESSING MODIFIER FOR POLYOLEFINS

CROSS REFERENCE

This is a continuation-in-part application of co-pending application, Ser. No. 284,419, filed July 20, 1981, now U.S. Pat. No. 4,342,848.

BACKGROUND OF THE INVENTION

This invention relates to a processing modifier for polyolefin resins. More particularly, this invention relates to the use of a polyvinyloctadecyl ether as an additive in the extrusion of polyolefin resins.

In the absence of a processing modifier, the surface of most extruded polyolefin resins is undesirably rough and non-uniform. Moreover, such extruded resins may exhibit a reduction in physical properties such as tensile strength at break, percentage elongation at break, tearing resistance, and impact resistance. Addition of process modifiers to extruded resin compositions is therefore beneficial in regard to physical strength properties and surface appearance. However, use of ineffective processing modifiers will limit these beneficial results and, furthermore, the excessive use of such additives may result in the reduction of other properties such as gloss, heat-sealability, blocking transparency and moisture resistance. Therefore, it is advisable to use only a small amount of effective additives.

SUMMARY

In general, the present invention provides a process for extruding polyolefin resins, comprising the steps of (a) heating above its melting point a mixture of about one hundred parts by weight of a polyolefin resin, and between about 0.03 and about 0.5 parts by weight of a polyvinyloctadecyl ether; and (b) extruding the melt formed in step (a), thereby forming an extrudate.

It is an object of this invention to provide a processing modifier for polyolefin resins. It is a further object of this invention to provide an improved process for extruding polyolefin resins. It is a further object of this invention to provide a process for extruding polyolefin resins whereby the extrudates are characterized by a smooth and uniform surface. It is a still further object of the invention to provide a process for the extrusion of polyolefin resins whereby the extrudates exhibit an improved tensile strength at break, percentage elongation at break, tearing resistance, and impact resistance. These and other objects of the invention will be apparent to those skilled in the art from the more detailed description which follows.

The following terms used herein are defined as follows:

"Polyolefin resins"—resins which are difficult to process without an undesirably rough and non-uniform surface under normal processing conditions unless a process modifier is used, including, but not limited to, such resins as polypropylene, medium and high density polyethylene, and linear low density polyethylene produced by polymerizing ethylene with an alpha-olefin co-monomer.

"Yield Strength"—expressed in pounds per square inch, as defined in ASTM Standard No. D 882, is the ratio of the yield load to the original minimum cross-sectional area of the specimen.

"Tensile Strength at Break"—expressed in pounds per square inch, as defined in ASTM Standard No. D 882, is the ratio of the load at break to the original cross-sectional area of the specimen.

"Percentage Elongation at Break"—expressed in percent, as defined in ASTM Standard No. D 882, is the ratio of the elongation at the moment of rupture of the specimen to the initial gage length of the specimen times one-hundred. "Tearing Resistance"—expressed in grams per millimeter, as defined in ASTM Standard No. D 1922, is calculated by the following formula:

$$\frac{\left(\begin{array}{l}\text{Corrected Scale Reading} \\ \text{on Elmendorf} \\ \text{Tear-Resistance Meter}\end{array}\right) (\text{machine capacity - grams})}{\text{Number of Sheets Torn}}$$

The Elmendorf Tear-Resistance Meter is described in ASTM Standard No. D 1922.

"Impact Resistance"—expressed in pounds per square inch, defined as work done per volume acted on, is calculated by the following formula:

$$\frac{(0.0139)\left(\begin{array}{l}\text{Scale reading on Elmendorf} \\ \text{Tear-Resistance Meter}\end{array}\right)(\text{Pendulum Factor})}{\text{Thickness of Specimen (inches)}}$$

DESCRIPTION OF THE PREFERRED EMBODIMENT

The following description illustrates the manner in which the principles of the present invention are applied, but is not to be construed as in any sense limiting the scope of the invention.

In the preferred method of practicing this invention, about one hundred parts by weight of a polyolefin resin is blended with between about 0.1 and about 0.3 parts by weight of a polyvinyloctadecyl ether. The mixture of polyolefin and polyether is heated to a temperature between about 140° C. and about 350° C. in an extruder, thereby forming a melt adapted for extrusion. The melt is then extended into a fused extrudate of any desired form or shape.

More preferably, the mixture is heated to a temperature between about 200° C. and about 300° C. in the extruder. The polyvinyloctadecyl ether used in the present invention as a process modifier is characterized as having a number-average molecular weight of between about 1,000 and about 10,000, and more preferably betweeen about 3,000 and about 5,000. A polyvinyloctadecyl ether suitable for practicing this invention is manufactured and sold by the American Hoechst Corporation, Mountainside, N.J., under the tradename "WAX V."

The present invention will now be further illustrated by means of the following examples, which are not to be interpreted as in any sense limiting the scope of the invention.

EXAMPLES

A sample of high-density polyethylene resin having a density of about 0.95, melt index of 0.5 using ASTM Method D1238, Condition P, and a weight average molecular weight between about 240,000 and about 250,000 was multiply-extruded into pellets on a three-quarter-inch 24:1 screw ratio thermoplastic extruder with a temperature profile for Zones 1 through 4 of 170°, 185°, 190°, and 190° C., respectively, at fifty revolutions per minute (RPM). The pellets obtained thereby were then blown into film on a one-inch laboratory extruder with a one-inch annular die and a die gap of 0.025 inches, at a screw speed of sixty RPM, and a temperature profile for Zones 1 and 2, and Gate and Die Zones 1 and 2 of 175°, 193°, 196°, 198°, and 198° C., respectively. Conventional film and rheological tests were made to characterize the extruded film.

In Example 1, no processing modifier was added to the polyethylene. In Example 2, 0.1 weight percent zinc stearate, a known processing modifier, was added. In Examples 3 and 4, 0.2 weight percent of a polyvinyloctadecyl ether was added, said ether characterized as having a number-average molecular weight of about 4,000. The test results obtained are listed in Table I, below.

TABLE I

| Example No. | Yield Strength | Tensile Strength at Break | Percentage Elongation at Break | Tearing Resist. | Impact Resist. |
|---|---|---|---|---|---|
| 1 | 3304 | 5248 | 570 | 46 | 774 |
| 2 | 2565 | 5411 | 656 | 67 | 1621 |
| 3 | 2956 | 6836 | 683 | 202 | 2147 |
| 4 | 3070 | 6818 | 688 | 183 | 2060 |

The data displayed in Table I above clearly show the results of adding a polyvinyloctadecyl ether to high-density polyethylene as a processing modifier during extrusion. With the exception of yield strength, the properties listed therein were significantly improved by the use of the polyether modifier according to the present invention. By way of comparison, the use of zinc stearate in Example 2 led to values of these properties which were intermediate between the resin extruded with no processing modifier added, in Example 1, and the resins extruded with the addition of 0.2 percent polyvinyloctadecyl ether, in Examples 3 and 4.

In addition, the surfaces of the films blown in Examples 3 and 4 were considerably smoother than the surface of the film blown in Example 1, and substantially smoother than the surface of the film blown in Example 2.

Additional samples 5-9 of pelletized polypropylene and linear low density polyethylene were blown into film on a one-inch laboratory extruder with a three-inch annular die and a die gap of 0.025 inches, at a screw speed of about fifty-five RPM. The extruder temperature profile for Zones 1 and 2, and Gate, and Die Zones 1 and 2 was 190°, 215°, 220°, 220°and 215° C., respectively, for the polypropylene, and 160°, 175°, 193°, 193° and 187° C., respectively, for the linear low density polyethylene. ,p Examples 5 and 6 illustrate the effect of the present modifier on linear low density polyethylene and Examples 7-9 illustrate its effect on polypropylene. No modifier was added to the linear low density polyethylene in Example 5, while 0.2 weight percent of a polyvinyloctadecyl ether with a number-average molecular weight of about 4000 was added in Example 6. In Example 7, no modifier was added to the polypropylene. In Examples 8 and 9, 0.2 and 0.5, weight percent, respectively, of the same ether was added to the polypropylene. The test results obtained are listed in Table II, below.

TABLE II

| Example No. | Resins | Extruder Amperage | Tearing Resist. Machine | Tearing Resist. Transverse | Impact Resist |
|---|---|---|---|---|---|
| 5 | Lin. Low P.E. | 4.0 | 190 | 950 | 1762 |
| 6 | Lin. Low P.E. | 3.6 | 165 | 1020 | 2561 |
| 7 | Polyprop. | 4.6 | 3 | 225 | 325 |
| 8 | Polyprop. | 4.2 | 4 | 420 | 300 |
| 9 | Polyprop. | 4.2 | 7 | 525 | 275 |

Like Table I, the data shown in Table II illustrates the benefit of adding a polyvinyloctadecyl ether to polyolefin resins. While the yield and tensile strength, and percent elongation, not shown, remained about the same for Examples 5-9, the impact for the linear low density polyethylene and the tearing resistance for the polypropylene were significantly improved. Moreover, there was a 10 to 15 percent reduction in the extrusion power requirement with the addition of the modifier as illustrated by the Extruder Amperage and the surfaces of the blown films were considerably smoother with the added modifier.

While certain representative embodiments and details have been shown for the purpose of illustrating the present invention, it will be apparent to those skilled in the art that various changes and modifications can be made therein without departing from the spirit and scope of the invention.

What is claimed is:

1. A process for extruding polyolefin resins, comprising the steps of:
   (a) heating above its melting point a mixture comprising about one hundred parts by weight of a polyolefin resin, and between about 0.03 and about 0.5 parts by weight of a polyvinyloctadecyl ether; and
   (b) extruding the melt formed in step (a) thereby forming an extrudate.

2. The process of claim 1, wherein the mixture comprises about one hundred parts of the polyolefin resin, and between about 0.1 and about 0.3 parts by weight of the polyvinyloctadecyl ether.

3. The process of claim 1, wherein the number-average molecular weight of the polyvinyloctadecyl ether is about 1,000 and about 10,000.

4. The process of claim 2, wherein the number-averge molecular weight of the polyvinyloctadecyl ether is between about 1,000 and about 10,000.

* * * * *

UNITED STATES PATENT AND TRADEMARK OFFICE
CERTIFICATE OF CORRECTION

PATENT NO. : 4,415,707
DATED : Nov. 15, 1983
INVENTOR(S) : Robert R. Blanchard and Tommy R. Bourne It is certified that error appears in the above—identified patent and that said Letters Patent is hereby corrected as shown below:

Column 1, Line 27, after "blocking" add --,--.

Column 2, Line 7, after "." make new paragraph; Line 50, "betweeen" should read "between".

Column 3, Line 10, "0.1" should read "0.2"; Line 52, delete ",p".

Column 4, Line 6, "propyelene" should read "polypropylene"; claim 3, Line 2, after "is" add --between--; Claim 4, Line 1, "number-averge" should read "number-average".

Signed and Sealed this

Tenth Day of July 1984

[SEAL]

Attest:

GERALD J. MOSSINGHOFF

Attesting Officer

Commissioner of Patents and Trademarks